US012646355B2

(12) United States Patent
Lee

(10) Patent No.: US 12,646,355 B2
(45) Date of Patent: Jun. 2, 2026

(54) FACE IMAGE PROCESSING METHOD AND DEVICE USING SAME

(71) Applicant: MEDIT CORP., Seoul (KR)

(72) Inventor: Dong Hoon Lee, Seoul (KR)

(73) Assignee: MEDIT CORP., Seoul (KR)

( * ) Notice: Subject to any disclaimer, the term of this patent is extended or adjusted under 35 U.S.C. 154(b) by 392 days.

(21) Appl. No.: 18/033,901

(22) PCT Filed: Oct. 21, 2021

(86) PCT No.: PCT/KR2021/014767
§ 371 (c)(1),
(2) Date: Apr. 26, 2023

(87) PCT Pub. No.: WO2022/092695
PCT Pub. Date: May 5, 2022

(65) Prior Publication Data
US 2023/0394873 A1      Dec. 7, 2023

(30) Foreign Application Priority Data

Oct. 29, 2020    (KR) ........................ 10-2020-0142090
Dec. 18, 2020    (KR) ........................ 10-2020-0178664

(51) Int. Cl.
*G06V 40/16*          (2022.01)
*G06T 3/40*           (2024.01)
(Continued)

(52) U.S. Cl.
CPC .............. *G06V 40/171* (2022.01); *G06T 3/40* (2013.01); *G06V 10/44* (2022.01); *G06V 10/46* (2022.01); *G06V 10/56* (2022.01)

(58) Field of Classification Search
CPC ...... G06V 40/171; G06V 10/44; G06V 10/46; G06V 40/165; G06V 40/168;
(Continued)

(56) References Cited

U.S. PATENT DOCUMENTS

2007/0215377 A1      9/2007   Aoki
2009/0284799 A1      11/2009  Matsuhira
(Continued)

FOREIGN PATENT DOCUMENTS

CN        106137414 A      11/2016
JP        2009-278325 A    11/2009
(Continued)

OTHER PUBLICATIONS

Sarwar, B. Rinner and A. Cavallaro, "A Privacy-Preserving Filter for Oblique Face Images Based on Adaptive Hopping Gaussian Mixtures," in IEEE Access, vol. 7, pp. 142623-142639, 2019. (Year: 2019).*
(Continued)

*Primary Examiner* — Sumati Lefkowitz
*Assistant Examiner* — Aaron Joseph Sorrin
(74) *Attorney, Agent, or Firm* — Sughrue Mion, PLLC

(57)                ABSTRACT

An image processing method according to the present disclosure includes the steps of receiving at least one piece of image data as an input, assigning a plurality of feature points to the image data, and modifying a part of the image data based on a feature line generated by connecting at least two of the plurality of feature points or a feature region generated by connecting at least three of the plurality of feature points.

12 Claims, 11 Drawing Sheets

(51) Int. Cl.
| | | |
|---|---|---|
| *G06V 10/44* | (2022.01) | |
| *G06V 10/46* | (2022.01) | |
| *G06V 10/56* | (2022.01) | |

(58) Field of Classification Search
CPC .................. A61B 5/4542; A61B 8/469; G06T
2207/30201; G06T 11/203
See application file for complete search history.

(56) References Cited

U.S. PATENT DOCUMENTS

| | | | | |
|---|---|---|---|---|
| 2014/0122027 | A1 | 5/2014 | Andreiko et al. | |
| 2015/0265374 | A1* | 9/2015 | Masoud | G06V 40/171 |
| | | | | 382/128 |
| 2019/0290400 | A1 | 9/2019 | Stone-Collonge et al. | |
| 2019/0350680 | A1* | 11/2019 | Chekh | A61C 7/002 |
| 2019/0378607 | A1* | 12/2019 | Chen | G06F 21/6254 |

FOREIGN PATENT DOCUMENTS

| | | | | | |
|---|---|---|---|---|---|
| JP | | 2014-91047 | A | 5/2014 | |
| JP | | 2014-171702 | A | 9/2014 | |
| KR | 10-2007-0093841 | A | 9/2007 | |
| KR | 10-2020-0014396 | A | 2/2020 | |
| WO | WO-2020062532 | A1 * | 4/2020 | ............ G06V 10/56 |

OTHER PUBLICATIONS

WO-2020062532-A1—english translation (Year: 2020).*
International Search Report for PCT/KR2021/014767 dated Jan. 21, 2022.
Korean Office Action issued Apr. 9, 2022 in Application No. 10-2020-0178664.
Notice of Final Rejection issued Dec. 27, 2022 in Korean Application No. 10-2020-0178664.
Korean Office Action issued Apr. 5, 2023 in Application No. 10-2020-0178664.

* cited by examiner

| $\frac{1}{9}$ | $\frac{1}{9}$ | $\frac{1}{9}$ |
|---|---|---|
| $\frac{1}{9}$ | $\frac{1}{9}$ | $\frac{1}{9}$ |
| $\frac{1}{9}$ | $\frac{1}{9}$ | $\frac{1}{9}$ |

FIG. 14

| $\dfrac{1}{16}$ | $\dfrac{1}{8}$ | $\dfrac{1}{16}$ |
|:---:|:---:|:---:|
| $\dfrac{1}{8}$ | $\dfrac{1}{4}$ | $\dfrac{1}{8}$ |
| $\dfrac{1}{16}$ | $\dfrac{1}{8}$ | $\dfrac{1}{16}$ |

Figure 15:
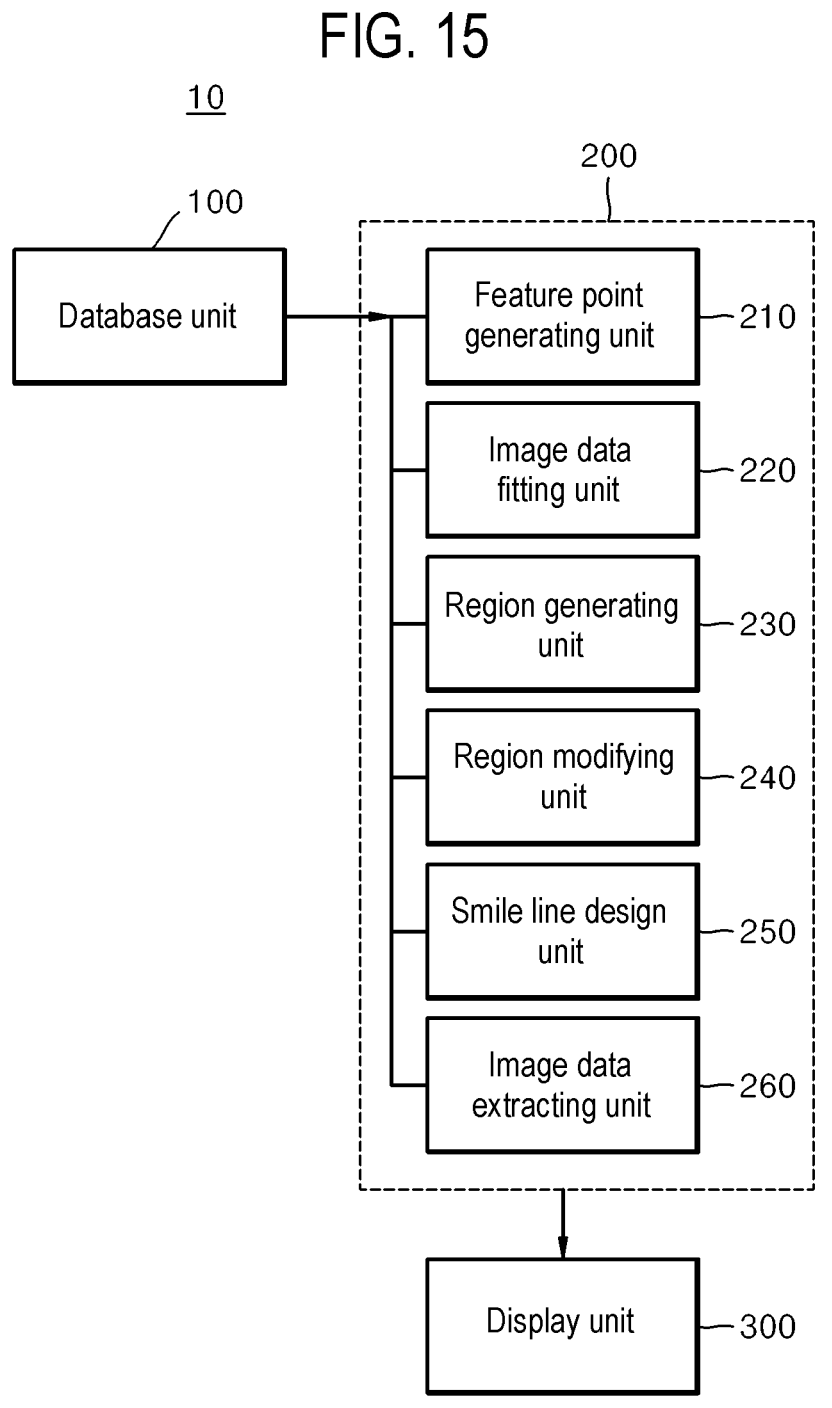

Database unit

200

| Feature point generating unit | ~210 |

| Image data fitting unit | ~220 |

| Region generating unit | ~230 |

| Region modifying unit | ~240 |

| Smile line design unit | ~250 |

| Image data extracting unit | ~260 |

Display unit — 300

1

FACE IMAGE PROCESSING METHOD AND DEVICE USING SAME

CROSS REFERENCE TO RELATED APPLICATIONS

This application is a National Stage of International Application No. PCT/KR2021/014767 filed Oct. 21, 2021, claiming priority based on Korean Patent Application No. 10-2020-0142090 filed Oct. 29, 2020 and Korean Patent Application No. 10-2020-0178664 filed Dec. 18, 2020, the entire disclosures of which are incorporated herein by reference.

TECHNICAL FIELD

The present disclosure relates to an image processing method and an apparatus using same.

BACKGROUND

A smile line is made according to tooth lines, tooth shapes, the degree of exposure of gums when smiling, gum lines, the length and thickness of lips, the length of the philtrum, and the degree and direction of activation of muscles around the lips and muscles associated therewith. A patient may have a desired smile line through a corrective treatment. In particular, a patient who considers a treatment such as a veneer or a laminate is curious about how the patient's face (more specifically, the smile line) will be changed by the treatment. A person's facial appearance varies according to what smile line he/she has, and designing of a smile line through a corrective treatment or operation is also referred to as smile design.

Meanwhile, smile design is performed by selecting a corrective template optimized to a patient while applying templates having information regarding corrected teeth to image data in which the patient's face appears. In this process, there is a possibility that image data to which a template has been applied will be shared between practitioners or patients, and sharing of image data exposes the patient's face and poses a concern of privacy infringement.

Therefore, there is a need for a method for guaranteeing the patient's anonymity even in the case of image data to which a template has been applied.

SUMMARY

In order to solve the above-mentioned problems, the present disclosure provides an image processing method wherein image data having a person's face data is received as an input, a plurality of feature points are assigned onto the image data, and a part of the image data is modified based on a feature line or a feature region generated from the plurality of feature points.

In addition, the present disclosure provides an image processing device configured to perform the image processing method such that a part of the image data is modified.

Technical problems to be solved by the present disclosure are not limited to the above-mentioned technical problems, and other technical problems not mentioned herein will be clearly understood from the following descriptions by those skilled in the art.

An image processing method according to the present disclosure includes receiving image data as an input, assigning a plurality of feature points to the image data, and modifying a part of the image data based on a feature line generated by connecting at least two of the plurality of feature points or a feature region generated by connecting at least three of the plurality of feature points.

In addition, an image processing device according to the present disclosure includes a database unit in which inputted image data is stored, and a control unit configured to assign a plurality of feature points to the inputted image data and modify a part of the image data based on a feature line or a feature region generated from the plurality of feature points.

The present disclosure is advantageous in that, when a user or a patient shares the patient's image data with another person, a part of the image data may be modified, thereby guaranteeing anonymity of the patient, and the user or the patient may establish an optimal corrective plan through discussion regarding a template applied to the image data.

BRIEF DESCRIPTION OF DRAWINGS

FIG. 3 is a diagram for explaining image data.

FIG. 11 and FIG. 12 are diagrams for explaining modification of a second feature region of image data.

FIG. 13 is a diagram for explaining a blurring process.

FIG. 14 is a diagram for explaining a Gaussian blurring process.

FIG. 15 illustrates a configuration of an image processing device according to the present disclosure.

BRIEF DESCRIPTION OF REFERENCE NUMERALS

Figure 1:
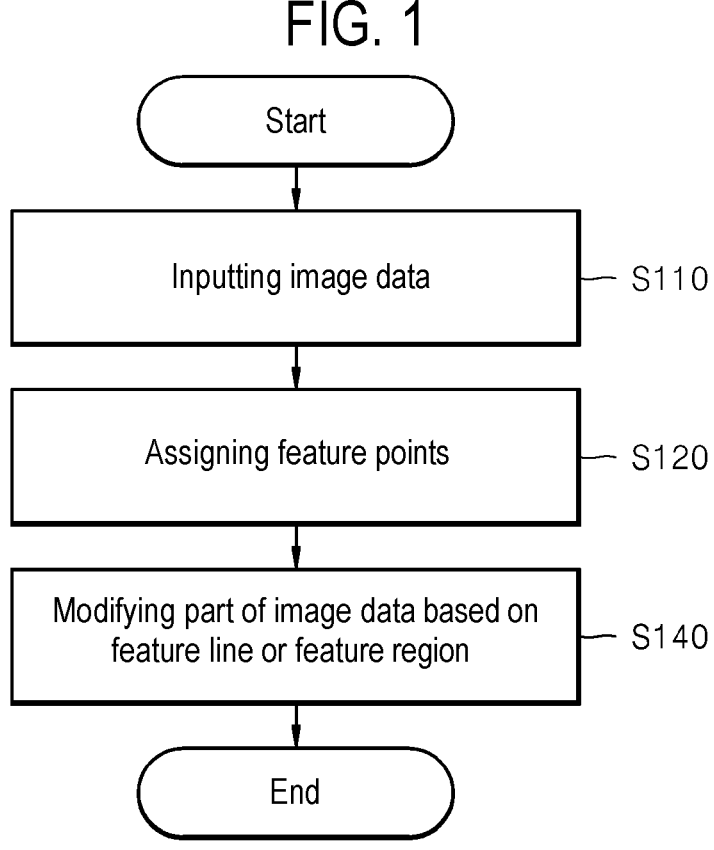
FIG. 1 and FIG. 2 are flowcharts of an image processing method according to the present disclosure.

S110: step of receiving image data as input
S120: step of assigning feature points
S130: fitting step
S140: modifying step
400: face data
500: anonymized image data
10: image processing device
100: database unit
200: control unit
300: display unit

DETAILED DESCRIPTION

Hereinafter, embodiments of the present disclosure will be described in detail with reference to exemplary drawings. It is to be noted that, in connection with assigning reference numerals to components in respective drawings, identical components are given identical reference numerals, if possible, even if illustrated in different drawings. In addition, in the following description of embodiments of the present disclosure, detailed descriptions of relevant known configurations or functions will be omitted if deemed to obscure understanding of embodiments of the present disclosure.

In the following description of embodiments of the present disclosure, terms such as first, second, A, B, (a), and (b) may be used. Such terms are only for distinguishing a component from another component, and do not limit the nature, sequence, order, or the like of the corresponding component. In addition, unless defined otherwise, all terms used herein, including technical or scientific terms, have the same meanings as generally understood by those skilled in the art to which the present disclosure pertains. Terms defined in generally used dictionaries are to be interpreted as having the same meanings as those in the context of relevant technologies, and are not interpreted in ideal or excessive formal senses unless explicitly defined herein.

Figure 2:
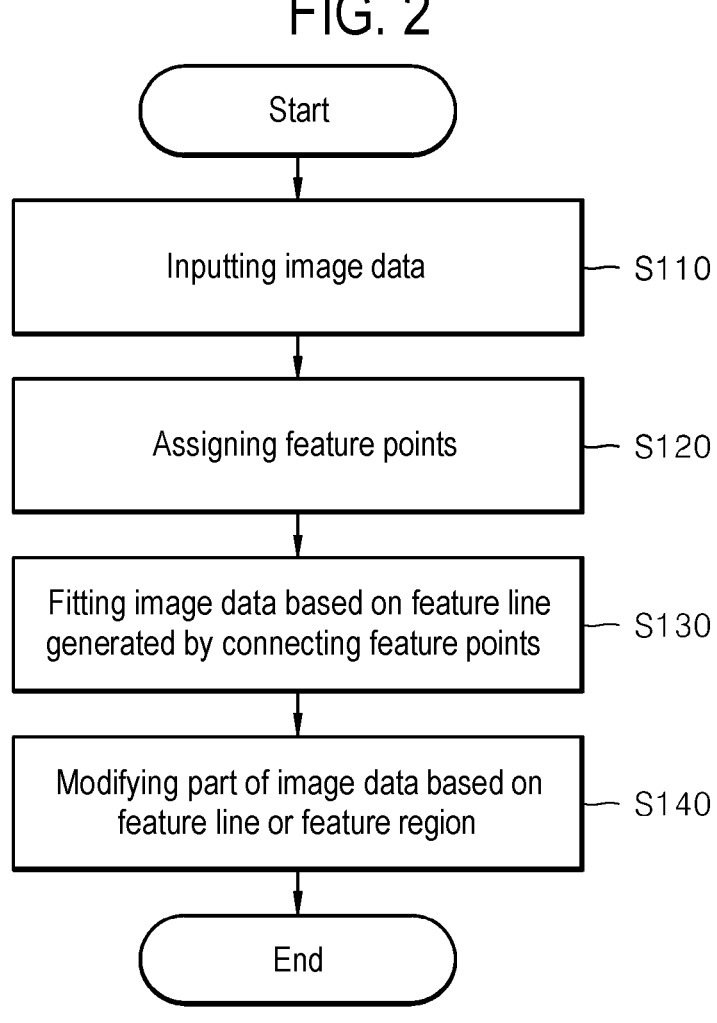

FIG. 1 and FIG. 2 are flowcharts of an image processing method according to the present disclosure, and FIG. 3 is a diagram for explaining image data.

Referring to FIG. 1 to FIG. 3, the image processing method according to the present disclosure may include a step (S110) of receiving image data as an input, a step (S120) of assigning a plurality of feature points onto the image data according to a predetermined standard, and a step (S140) of modifying a part of the image data based on a feature line generated by connecting at least two of the plurality of feature points or a feature region generated by connecting at least three of the plurality of feature points.

Hereinafter, the individual steps of the image processing method according to the present disclosure will be described in detail.

In the step (S110) of receiving image data as an input, at least one piece of image data of a patient that has already been captured may be received as an input. Here, the image data is stored in a data storage element referred to as a database unit (DB unit), and may be input by the user's manipulation. The DB unit in which image data is stored may be a physical storage device such as a hard disk drive, a floppy disk drive, a solid state drive, or a flash memory drive, and may also be a cloud-type virtual database.

Preferably, the image data may be a person's face data 400. More specifically, the image data is face data 400 in which a person's eyes, nose, mouth, and the like are visible, and particularly in the face data 400, a person's oral cavity may be open, thereby exposing teeth. The face data 400 may be normal image data having a natural smile, and in the face data 400, oral commissures may be lifted, thereby partially exposing teeth and gums. The partially exposed teeth and gums are included in a feature region described later, and a template for tooth correction may be virtually applied in the corresponding region. A template refers to a corrected tooth sample model, and the template may have standard information of a position, size, and shape regarding at least one tooth. A user and a patient may overlay the template onto the patient's tooth of image data so as to predict the shape of the tooth after correction. In addition, multiple templates may be provided to provide the patient with an optimal corrective object, and the user and the patient may selectively apply the multiple templates to the patient's tooth of image data, thereby determining the template most appropriate for the patent's tooth.

Meanwhile, face data may be normal face data having a smile line, and may also be open face data having a larger degree of openness than the normal face data because the oral cavity is forcibly opened with a gag or the like. The normal face data may be used by the user and the patient to apply a template such that a corrective plan is established, and the open face data may be used by a dental technician to fabricate a corrective object. The corrective object may refer to an object applied to the patient's oral cavity. For example, the corrective object may refer to a prosthesis including a veneer and a laminate, a corrective device, and the like.

Image data that has been input may appear on a user interface (UI) screen, and the image data may be displayed to the user and the patient through an output device configured to display the UI screen. As the output device, various types of devices may be used, and a display device capable of visually displaying image data may be used among the devices. For example, the output device may be a monitor or a touch panel. However, the output device is not limited to the above-mentioned examples, and at least one of known types of display devices may be used as the output device.

Hereinafter, a process in which feature points are assigned onto image data will be described.

Figure 4:
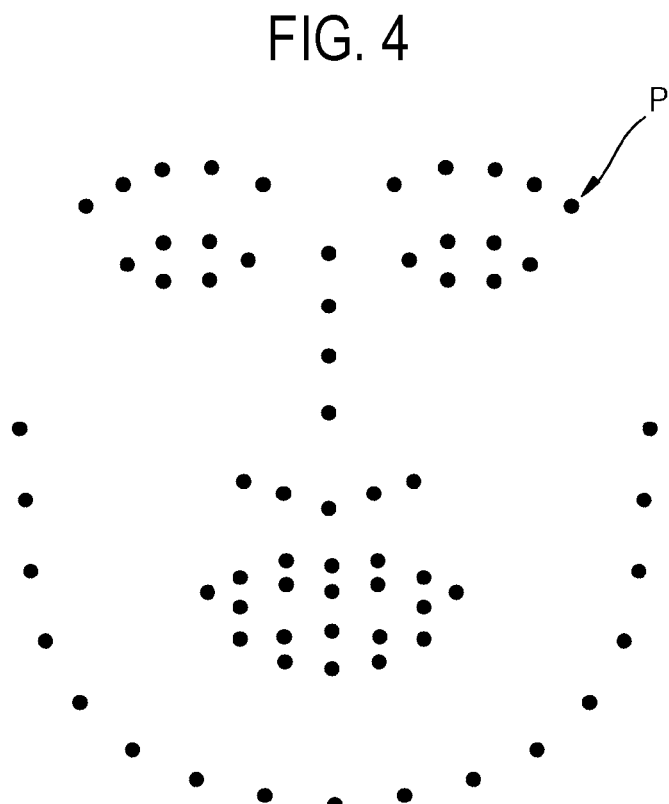
FIG. 4 is a diagram for explaining assignment of feature points.

FIG. 4 is a diagram for explaining assignment of feature points P.

Referring to FIG. 4, in the step (S120) of assigning feature points, a plurality of feature points P may be assigned to characteristic portions on image data according to a predetermined standard based on face data described above. More specifically, the characteristic portions may be eyebrows, eye contours between upper and lower eyelids, the nose, lip outsides, lip insides, and the facial contour. The number of feature points P assigned in the step (S120) of assigning feature points may be determined such that characteristic portions of image data described above can be effectively represented.

For example, in the step (S120) of assigning feature points, an AI Facial Landmarks Detection scheme may be used to express characteristic portions of image data. It will be assumed in the following description that the step (S120) of assigning feature points of the image processing method according to the present disclosure uses Face Landmark 68 algorithm in which 68 feature points P are assigned to the image data, among AI Facial Landmarks Detection schemes. However, the step (S120) of assigning feature points is not necessarily limited to using only the Face Landmark 68 algorithm, and any algorithm may be used as long as features of image data can be easily represented.

Meanwhile, when image data is input, if the image data that has been input is excessively rotated in one direction, feature points P may fail to be accurately assigned to the image data. Therefore, in the step (S120) of assigning feature points, a plurality of feature points P may be assigned based on the face data 400 while rotating the image data at a predetermined angle interval.

For example, in the step (S120) of assigning feature points, the feature points P may be assigned while rotating the image data clockwise or counterclockwise at an interval of 90°. As another example, in the step (S120) of assigning feature points, the feature points P may be assigned while rotating the image data clockwise or counterclockwise at an interval of 15°. There is an advantage in that, by assigning the feature points P while rotating the image data, it is possible to accurately recognize the image data and to assign the feature points P, and it is possible to modify a part of the image data in a normal position and to apply a template.

According to another embodiment, in the step (S120) of assigning feature points, artificial intelligence may be used to select image data most appropriate for the face data 400 from multiple pieces of two-dimensional image data and continuous video data, and to assign the feature points P to the selected image data. The step (S120) of assigning feature points by using artificial intelligence, if performed, is advantageous in that appropriate image data is automatically selected to assign the feature points P, even if the user does not manually input image data most appropriate for the face data 400.

Hereinafter, as an additional step of the image processing method according to the present disclosure, a step (S130) of fitting image data based on feature points assigned to the image data will be described.

Figure 5:
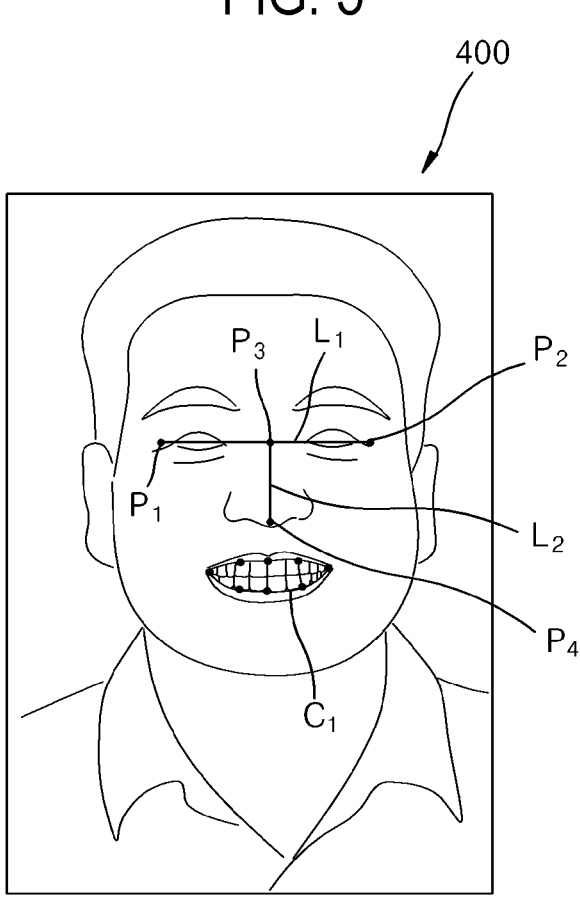
FIG. 5 is a diagram for explaining a feature line and a feature region generated based on some of feature points assigned to image data.
Figure 6:
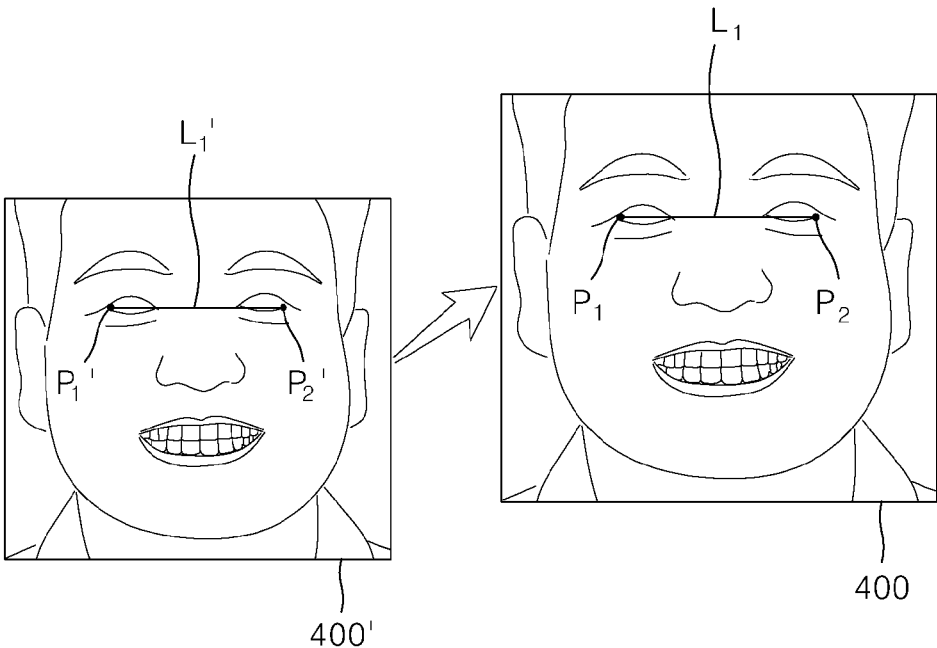
FIG. 6 and FIG. 7 are diagrams for explaining an image data fitting process.
Figure 7:
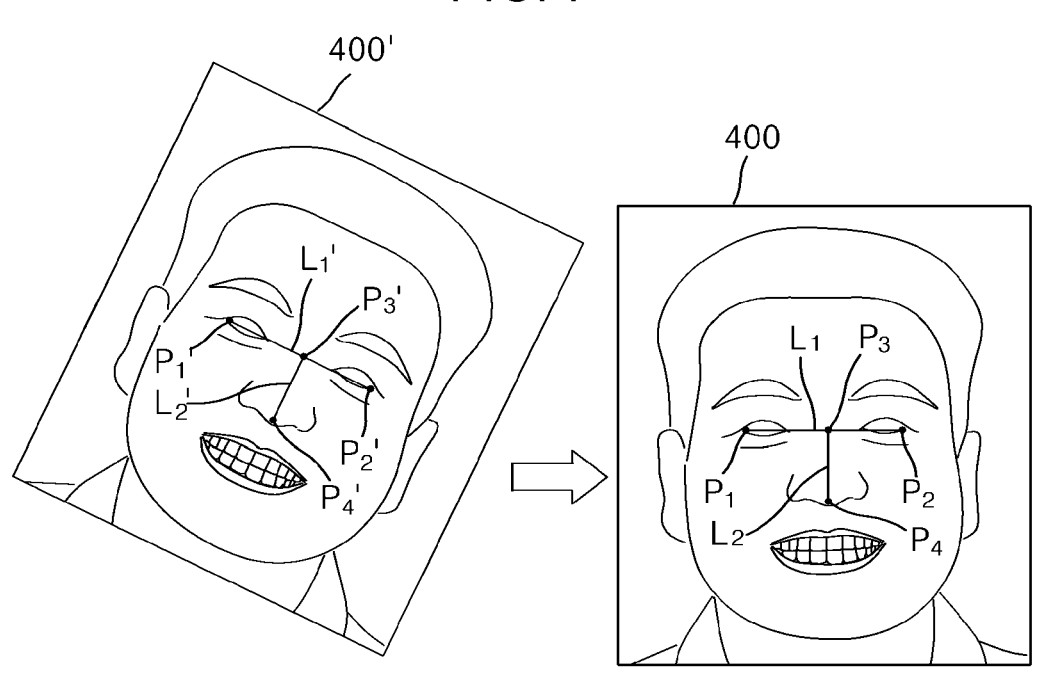

FIG. 5 is a diagram for explaining a feature line and a feature region generated based on some of feature points assigned to image data, and FIG. 6 and FIG. 7 are diagrams for explaining an image data fitting process.

Referring to FIG. 5 to FIG. 7, if feature points are assigned onto image data, a step (S130) of fitting the image data so as to have at least one of a predetermined size or a predetermined angle based on the assigned feature points may be performed additionally. That is, the positions of feature points P, the distance between feature points P, and the angle between feature points P may be obtained, and these pieces of information may be used to perform the image processing method according to the present disclosure.

In the fitting step (S130), a predetermined feature line may be generated from feature points P assigned in the above-described step (S120) of assigning feature points. For example, a feature line may be generated by connecting at least two feature points among the assigned feature points, and the generated feature line may be a line connecting feature points P1' and P2' corresponding to the lateral angle of respective eyes in face data. This feature line is referred to as a first feature line L1' or an eyeline. Meanwhile, the feature points P1' and P2' may be the 37th feature point and the 46th feature point, respectively, but are not limited to these examples.

In the fitting step (S130), the size of image data may be expanded or reduced based on a generated feature line. More specifically, in the fitting step (S130), the size of image data may be expanded or reduced such that the length of a first feature line L1' conforms to a predetermined length. For example, if the length of the first feature line L1' is 300 pixels, and if a preset target length is 400 pixels, the size of the image data may be expanded by multiplying the same by a predetermined value such that the length of a fitted first feature line L1 becomes 400 pixels. Meanwhile, if the length of the first feature line L1' is larger than the preset target length, the size of the image data may be reduced by multiplying the same by a predetermined value such that the length of a fitted first feature line L1 becomes the preset target length.

In addition, in the fitting step (S130), the image data may be rotated based on a generated feature line. In order to rotate the image data, in the fitting step (S130), the image data may be rotated based on a second feature line L2' different from the first feature line L1'. More specifically, in the fitting step (S130), the image data may be rotated by using a second feature line (or midline) L2' generated by connecting one point of the first feature line L1' and a feature point spaced apart from the first feature line L1'. The second feature line L2' may be generated by connecting a center point P3' of the first feature line L1' and a feature point P4'. For example, the feature point P4' may be feature point no. 34.

Based on the generated second feature line L2', in the fitting step (S130), the image data is fitted such that a smile line is designated at a normal angle by using the image data. For example, the angle of a fitted second feature line L2 may be perpendicular to the horizontal direction in a user interface (UI) plane on which the image data is input and displayed.

If the image data is fitted through the above-mentioned process so as to conform to at least one of a predetermined size or a predetermined angle, the user may apply a template accurately to the fitted face data 400 and may establish a highly reliable corrective plan.

Selectively, if the angle of the image data has been fitted differently from the user's intent, the user may manually rotate the image data by a predetermined angle. For example, the image data may be rotated clockwise or counterclockwise by using the center point P3 of a fitted first feature line L1 as a center of rotation, and the predetermined angle by which the image data may be rotated may be within about 5° clockwise or counterclockwise. By micro-rotating the image data manually by a predetermined angle according to the user's assessment in this manner, the user may acquire the image data fitted more appropriately for image data analysis and smile line design.

Hereinafter, a process of applying a template to image data will be described.

Figure 8:
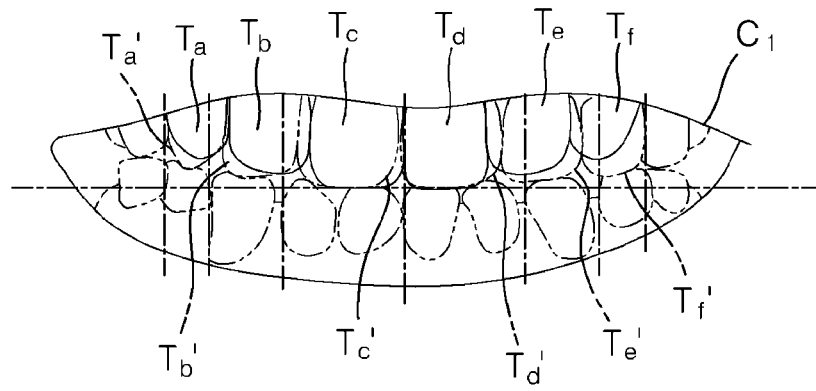
FIG. 8 is a diagram for explaining application of a template to image data.

FIG. 8 is a diagram for explaining application of a template to image data.

Referring to FIG. 5 and FIG. 8, after fitting of the image data is completed, a step (not illustrated) may be performed so as to apply at least one template to a predetermined region of the image data based on a feature point, thereby designing a smile line. The template may be corrected tooth data prestored in a database, and multiple templates may be provided such that an optimal template is applied to the patient's image data. The template may be customized by the user according to the patient's oral state. For example, the user may change the shape of teeth Ta, Tb, Tc, Td, Te, and Tf of the template. The shape of teeth may be changed by adjusting the tooth contour constituting teeth Ta, Tb, Tc, Td, Te, and Tf of the template. In addition, the user may change the position, size, color, or shading of teeth Ta, Tb, Tc, Td, Te, and Tf of the template. By changing the position or size of teeth Ta, Tb, Tc, Td, Te, and Tf of the template, the position or size of adjacent teeth may be changed in an interlinked manner. In addition, by changing the color or shading of teeth Ta, Tb, Tc, Td, Te, and Tf of the template, a comprehensive dental treatment plan may be considered in view of not only prosthodontics, but also whitening treatment. By customizing teeth Ta, Tb, Tc, Td, Te, and Tf of the template in this manner, the user may provide the patient with an optimal treatment plan.

Meanwhile, in the designing step, a template may be applied to a feature region generated by connecting at least three feature points among multiple feature points assigned in the feature point assigning step (S120). More specifically, a lipline generated by connecting feature points constituting lip insides, among the feature points assigned onto image data, may be formed into a first feature region C1 among feature regions, and a template may be applied to tooth images Ta', Tb', Tc', Td', Te', and Tf existing in the first feature region C1. More specifically, in the designing step (S160), a feature region C1 generated by connecting at least three feature points may be recognized as a lipline (lipline recognizing step), a tooth region having a tooth image appearing in the feature region C1 may be recognized (tooth region recognizing step), and a template may be matched with a tooth image in the feature region C1 constituting a lipline by using a template matching algorithm with regard to the tooth region (template matching step). According to the template matching algorithm, a template is matched in a tooth image position expressed in the feature region C1, and a template may be automatically matched to the tooth region having an element similar to the template in view of an element such as shape, size, or color. By applying a template to a feature region in this manner, erroneous application of a template to a region other than the first feature region C1 of image data may be prevented.

Meanwhile, an incorrect feature region may be generated due to unclear positions of feature points P when a feature region C1 is generated. In such a case, a function for correcting feature points formed on a user interface may be used to correct the feature points P and the contour of the first feature region C1, thereby performing more precise feature region acquisition and template application processes.

Hereinafter, the step (S140) of modifying a part of image data based on a feature line or a feature region will be described in detail.

Figure 9:
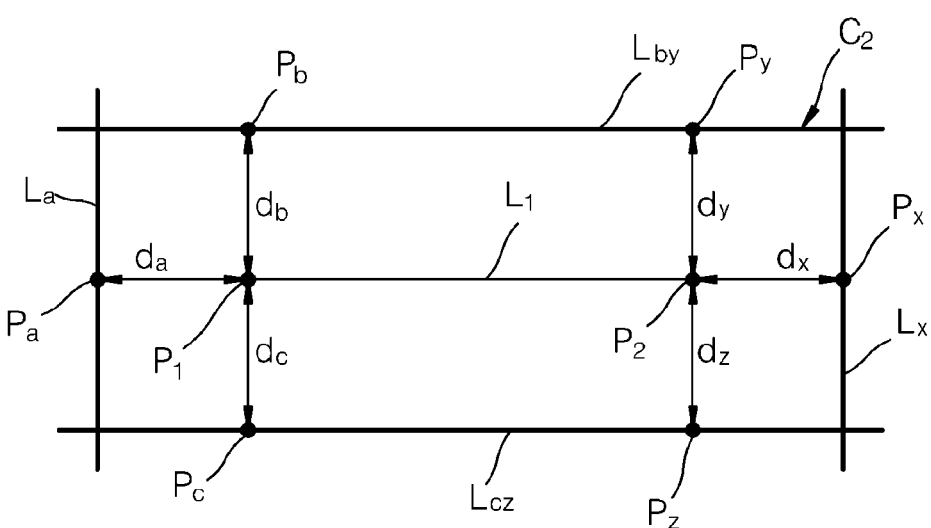
FIG. 9 is a diagram for explaining a second feature region in connection with an image processing method according to the present disclosure.
Figure 10:
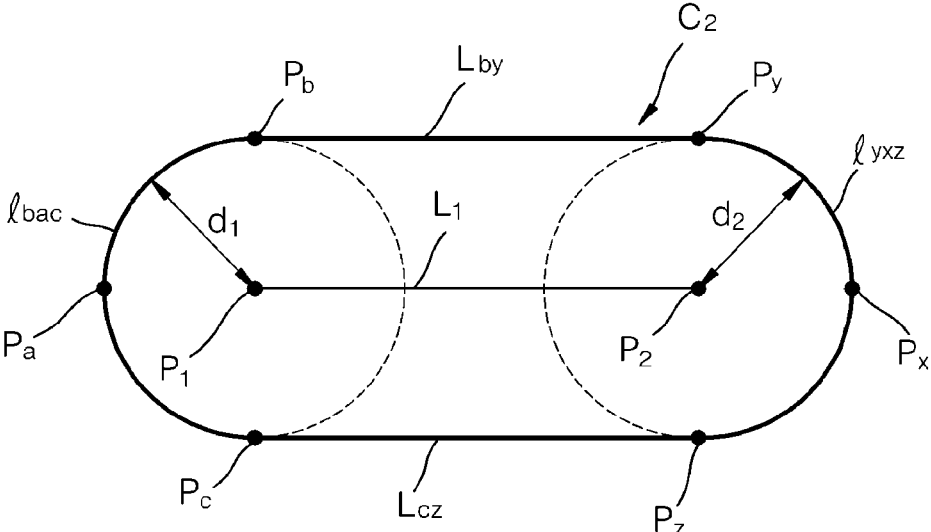
FIG. 10 is another embodiment of FIG. 9.
Figure 11:
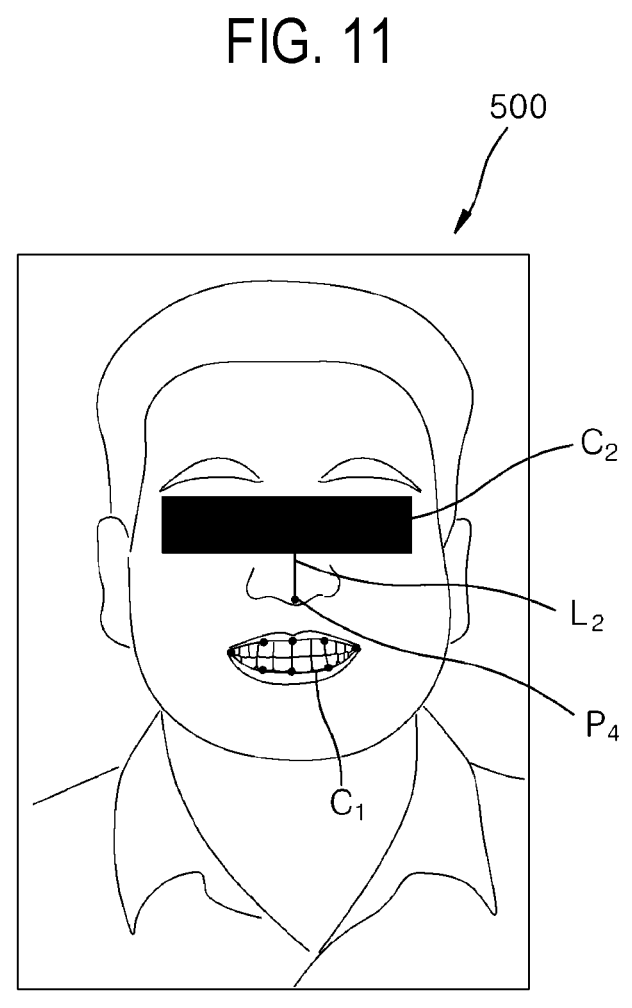
Figures 12, 13:
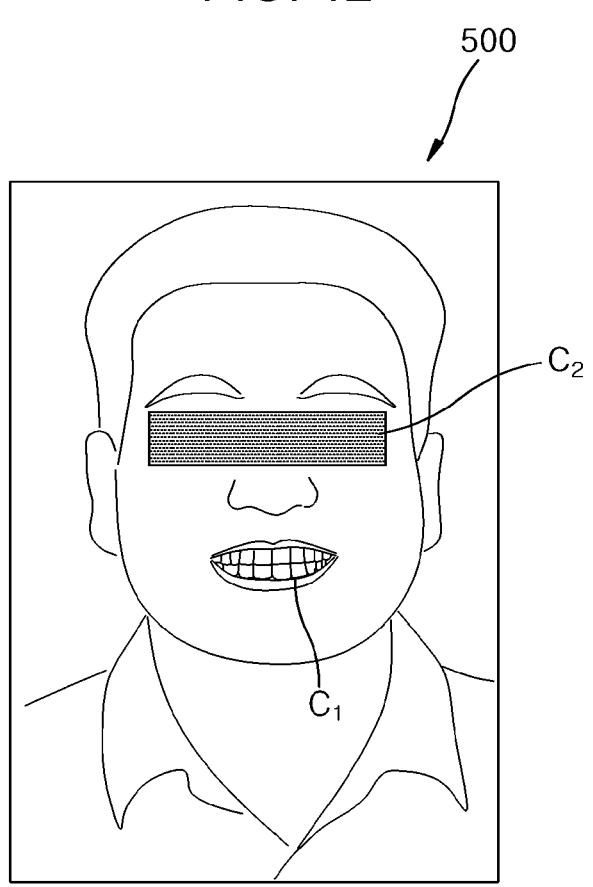

FIG. 9 is a diagram for explaining a second feature region in connection with an image processing method according to the present disclosure. FIG. 10 illustrates another embodiment of FIG. 9. FIG. 11 and FIG. 12 are diagrams for explaining modification of a second feature region of image data. FIG. 13 is a diagram for explaining a blurring process. FIG. 14 is a diagram for explaining a Gaussian blurring process.

Referring to FIG. 5 and FIG. 9, in the modifying step (S140), if a plurality of feature points P are assigned to image data, a part of the image data may be modified based on a feature line or a feature region generated by connecting at least two of the feature points P. As used herein, "modifying a part of image data" may mean that the part is subjected to predetermined processing, thereby making it difficult to identify whose face data the image data has.

It will be assumed in the following description that, as the predetermined processing, a part of the image data is modified by using a predetermined color or a predetermined pattern. However, the predetermined processing is not limited thereto, and may be interpreted as denoting various types of other processing, such as cutting a part of the image data, or inserting a figure into a part of the image data.

The feature region may include a first feature region C1 to which a template is applied, as described above. In addition, the feature region may further include a second feature region C2 generated based on at least two feature points in the face data 400. The second feature region C2 may be formed to be spaced apart from the first feature region C1 to which a template is applied. Therefore, even if the inside of the second feature region C2 (described later) is modified, the first feature region C1 may not be affected, and the template applied to the first feature region C1 may not be damaged. The manner in which the inside of the second feature region C2 is modified will be described later.

Meanwhile, the second feature region C2 may include a first feature point P1 and a second feature point P2, which constitute a contour of eyes, of the face data 400. More specifically, the first feature point P1 and the second feature point P2 may be feature points corresponding to lateral angles of respective eyes of the face data in the fitting step (S130) described above. For example, the feature points P1 and P2 may be feature point no. 37 and feature point no. 46, respectively.

The second feature region C2 may include the first feature point P1 and the second feature point P2 such that the second feature region C2 is modified to include the patient's eye parts of the face data 400.

The range covered by the second feature region C2 will be described in more detail. The same may include a first feature line L1 generated by connecting the first feature point P1 and the second feature point P2. The second feature region C2 may include a first point Pa spaced apart from the first feature point P1 by a first distance da in a longitudinal direction of the first feature line L1, and a second point Px spaced apart from the second feature point P2 by a second distance dx in the longitudinal direction of the first feature line L1. The first point Pa and the second point Px may be formed side by side in the longitudinal direction of the first feature line L1 so as to be opposite from the first feature line L1. In addition, the first point Pa and the second point Px may form a horizontal length of the second feature region C2.

In addition, the second feature region C2 may include a third point Pb spaced apart from the first feature point P1 by a third distance db in a direction perpendicular to the longitudinal direction of the first feature line L1, and a fourth point Pc spaced apart from the first feature point P1 by a fourth distance dc in a direction opposite to the direction in which the third point Pb is formed. The third point Pb and the fourth point Pc may constitute horizontal lines Lby and Lcz of the second feature region C2, respectively.

The second feature region C2 may include a fifth point Py spaced apart from the second feature P2 by a fifth distance dy in a direction perpendicular to the longitudinal direction of the first feature line L1, and a sixth point Pz spaced apart from the second feature point P2 by a sixth distance dz in a direction opposite to the direction in which the fifth point Py is formed. The fifth point Py and the sixth point Pz may constitute horizontal lines Lby and Lcz of the second feature region C2, respectively.

Referring to FIG. 9, the first feature line L1 and the first to sixth points Pa, Px, Pb, Pc, Py, and Pz generated from the first feature point P1 and the second feature point P2 that constitute the first feature line may form a boundary of the second feature region C2. For example, a first horizontal line Lby may be formed to extend through the third point Pb and the fifth point Py, and a second horizontal line Lcz may be formed to extend through the fourth point Pc and the sixth point Pz. In addition, a first vertical line La may be formed by the first point Pa in a direction perpendicular to the longitudinal direction of the first feature line L1, and the first vertical line La may be connected to each of the first horizontal line Lby and the second horizontal line Lcz. In addition, a second vertical line Lx may be formed by the second point Px in a direction perpendicular to the longitudinal direction of the first feature line L1, and the second vertical line Lx may be connected to each of the first horizontal line Lby and the second horizontal line Lcz. Accordingly, the first horizontal line Lby, the second horizontal line Lcz, the first vertical line La, and the second vertical line Lx may be connected to form a rectangular second feature region C2 such that the inside of the second feature region C2 can be subjected to predetermined processing.

Meanwhile, the first to sixth distances da, dx, db, dc, dy, and dz may be identical, and the second feature region C2 may include eyes no matter what face data is used.

As another example, the first to sixth distances da, dx, db, dc, dy, and dz may be automatically set so as to correspond to face data appearing in image data. That is, the first to sixth distances da, dx, db, dc, dy, and dz may be set to have values corresponding to the face data. For example, the first distance da and the second distance dx may be horizontal distances from the first feature point P1 and the second feature point P2 to virtual vertical lines including ends of eye wrinkles, respectively. Alternatively, if the first feature point P1 and the second feature point P2 correspond to lateral angles of eyes, respectively, the cover length may be sufficient in the horizontal direction (for example, in the longitudinal direction of the first feature line L1), and the first distance da and the second distance dx may be zero.

In addition, the third distance db may be a vertical distance from the first feature point P1 to a virtual horizontal line including the eyeline topmost point of the right eye in the face data (for example, a vertical distance in a direction perpendicular to the longitudinal direction of the first feature line L1). In addition, the fourth distance dc may be a vertical distance from the first feature point P1 to a virtual horizontal line including the eyeline bottommost point of the right eye in the face data (for example, a vertical distance in a direction perpendicular to the longitudinal direction of the first feature line L1). Likewise, the fifth distance dy may be a vertical distance from the second feature point P2 to a virtual horizontal line including the eyeline topmost point of the left eye in the face data, and the sixth distance dz may be a vertical distance from the second feature point P2 to a virtual horizontal line including the eyeline bottommost point of the left eye in the face data.

As another example, the third distance db may be a vertical distance from the first feature point P1 to a virtual horizontal line including a feature point formed in the uppermost position among feature points representing the eyeline of the right eye in the face data, and the fourth distance dc may be a vertical distance from the first feature point P1 to a virtual horizontal line including a feature point formed in the bottommost position among the feature points representing the eyeline of the right eye in the face data. In addition, the fifth distance dy may be a vertical distance from the second feature point P2 to a virtual horizontal line including a feature point formed in the uppermost position among feature points representing the eyeline of the left eye in the face data, and the sixth distance dz may be a vertical distance from the second feature point P2 to a virtual horizontal line including a feature point formed in the bottommost position among feature points representing the eyeline of the left eye in the face data.

There is an advantage in that, if a second feature region C2 is formed to have a size corresponding to the face data through the above-mentioned process, the second feature region C2 may be formed to have a minimum size, system resources used to anonymize the patient may be saved, and a smile line may be easily designed.

Referring to FIG. 10, the second feature region C2 may have a shape of a rod, both sides of which are round. For example, a first point Pa, a third point Pb, and a fourth point Pc may be formed to be spaced apart from the first feature point P1 by a first distance d1, and a second point Px, a fifth point Py, and a sixth point Pz may be formed to be spaced apart from the second feature point P2 by a second distance d2. The first point Pa, the third point Pb, and the fourth point Pc may form a first arc lbac, and the second point Px, the fifth point Py, and the sixth point Pz may form a second arc lyxz. Therefore, the first arc lbac, the second arc lyxz, the first horizontal line Lby, and the second horizontal line Lcz may be interconnected to form a second feature region C2. If the second feature region C2 is formed by using the first arc lbac and the second arc lyxz in this manner, the user may effectively prevent the patient's face from being exposed while minimizing the processed part of the second feature region C2, and may guarantee anonymity of the patient.

Hereinafter, a process in which the second feature region C2 is modified will be described.

Referring to FIG. 11, in the modifying step (S140), at least one of a predetermined color or a predetermined pattern may be applied to the second feature region C2. For example, pixels inside the second feature region C2 may have information of image data, and the information may be color, curvature, and the like. A specific color may be allocated to the pixels inside the second feature region C2. For example, a black color may be allocated to the pixels inside the second feature region C2. Therefore, the pixels inside the second feature region C2 may display the allocated black color when the image data is displayed, and the second feature region C2 including eyes of the face data of the image data may be silhouetted. By silhouetting the second feature region C2 in this manner, the user may provide an optimal corrective plan while minimizing exposure of the patient's personal information.

In addition, the second feature region C2 may also be modified such that a predetermined pattern is overlaid in the second feature region C2, and any type of processing is possible as long as exposure of the patient's personal information is minimized.

Referring to FIG. 12, the inside portion of the second feature region C2 may be modified to be blurred. Such processing is referred to as blurring, and blurring may correspond to averaging the color of pixels constituting the second feature region C2 (pixel value average). FIG. 13 illustrates a 3×3 averaging filter kernel regarding a part of the second feature region C2, for example. Provided that one pixel constituting the second feature region C2 is a center pixel, all pixel values of nine adjacent pixels, including the center pixel, with reference to the center pixel are summed up. The sum is divided by 9, and the resulting value may be allocated as a center pixel value. This process may be applied to all pixels constituting the second feature region C2, thereby blurring the pixels constituting second feature region C2. In order to blur the second feature region C2 of image data, not only the above-mentioned averaging scheme, but also various other schemes may be applied, such as Gaussian filtering illustrated in FIG. 14 in which a differentially modified pixel value is allocated to each pixel, median filtering, and bilateral filtering. By modifying the second feature region through blurring as described above, the user may provide an optimal corrective plan while minimizing exposure of the patient's personal information.

Meanwhile, the image data, the second feature region C2 of which has been modified, may be extracted as anonymized image data 500. In an embodiment, the anonymized image data 500 may be face data, the second feature region C2 of which has undergone predetermined processing such that a part of the image data is modified. By sharing the anonymized image data 500, exposure of the patient's face may be minimized, and the patient may be provided with an optimal corrective plan through discussion between practitioners.

At least a part of the above-described process may be displayed through an output device such as a display device, and the user and the patient may easily identify the process in which the image processing method according to the present disclosure is performed. There is an advantage in that the user can customize feature points, feature lines, feature regions, and templates on a user interface through an input device, and the user can provide the corrective object desired by the patient.

In addition, the content of modification of the second feature region C2 modified/applied to the image data may be applied or canceled. There is an advantage in that, by applying or canceling the content of modification of the second feature region C2, the user and the patient can easily identify how a template will be applied to the patient's face as a whole when discussing a corrective plan, and exposure of the patient's face is minimized and anonymity is guaranteed when sharing image data with other practitioners and the like.

Hereinafter, an image processing device according to the present disclosure will be described in detail. In the following description of the image processing device, descriptions identical to those made in connection with the image processing method will be mentioned briefly or omitted.

FIG. 15 illustrates a configuration of an image processing device according to the present disclosure.

Referring to FIG. 15, the image processing device 10 according to the present disclosure may include a database unit 100 in which image data is stored, a control unit 200 configured to receive at least one piece of image data from the database unit 100 as an input, assign a plurality of feature points to the image data, and modify a part of the image data based on at least one feature line or a feature region generated by connecting at least two feature points among the feature points, and a display unit 300 configured to visually display the result of processing performed by the control unit 200.

Hereinafter, the individual components will be described.

The database unit 100 may store image data. The image data may be face data in which the oral cavity is open, thereby exposing teeth. The description that the oral cavity is open may mean that the lips are open, thereby partially exposing teeth or gums, and the face data may be normal face data having a natural smile line or open face data related to forced opening thereof. That is, any type of face data can be used as long as a template can be applied since teeth are exposed. The database unit 100 may include not only image data, but also an algorithm for generating feature points, at least one of tooth template data to be applied to the image data, and the like.

As described above in connection with the image processing method according to the present disclosure, the database unit 100 may be a physical storage device or a cloud.

Meanwhile, the control unit 200 may receive at least one piece of image data from the database unit 100 as an input, and may perform assignment of feature points to the image data, fitting an image so as to conform to a predetermined standard, smile line design, and the like. In addition, the control unit 200 may modify a part of the image data. Detailed components of the control unit 200 will now be described.

The control unit 200 may include a feature point generating unit 210 configured to assign a plurality of feature points to the image data according to a predetermined standard.

The feature point generating unit 210 assigns feature points to characteristic portions of received image data. The characteristic portions may include, as described above, eyebrows, lower eyelids, upper eyelids, the nose, lip outsides, lip insides, and the facial contour. In order to represent the characteristic portions, feature points are assigned to the characteristic portions, and a plurality of feature points may be assigned to the image data. Feature points may be used as reference points when generating feature lines and feature regions (described later). In addition, the feature point generating unit 210 may rotate the image data at a predetermined angle interval, in order to assign accurate feature points to the image data, such that feature points are assigned to the image data at an optimal angle. Meanwhile, the feature point generating unit 210 may use a predetermined standard based on the face data in order to assign feature points to the image data, and the standard is as described above.

In addition, the control unit 200 may further include an image data fitting unit 220. The image data fitting unit 220 may fit image data so as to have at least one of a predetermined size or a predetermined angle based on at least one feature line generated by connecting feature points assigned by the feature point generating unit 210. For example, the image data fitting unit 220 may expand or reduce the size of the image data such that the length of a first feature line generated by connecting feature points generated at lateral angles of both eyes conforms to a predetermined length. In addition, the image data fitting unit 220 may rotate the image data such that a second feature line generated by one point of the first feature line and a feature point spaced apart from the first feature line has a predetermined angle. The image data fitting unit 220 may rotate the image data such that the angle of the second feature line is perpendicular to the horizontal direction in the user interface plane.

Hereinafter, a method for fitting image data received from the image data fitting unit 220 is as described above in connection with the image processing method.

After the image data fitting unit 220 completes fitting, the smile line design unit 250 may design a smile line of the fitted image data. The description that a smile line is designed may mean that at least one template is applied to a feature region generated by feature points of the image data generated based on the feature points. The feature region of the image data may be generated by a region generating unit 230 of the control unit. The feature region generated by the region generating unit 230 may be a first feature region generated by connecting at least three feature points among a plurality of feature points assigned by the feature point generating unit 210. For example, the first feature region may be an inner region of a lipline generated by connecting feature points related to lip insides of the face data. The first feature region includes data indicating teeth, and the smile line design unit 250 may apply a template related to corrected teeth to the first feature region so as to represent the patient's tooth state after correction.

Meanwhile, the feature region generated by the region generating unit 230 may further include a second feature region generated based on at least two feature points in the face data. For example, the second feature region may include eyes of the face data, and the second feature region may include a first feature point and a second feature point which constitute the contour of eyes of the face data. In addition, the second feature region may be formed to be spaced apart from the first feature region. The first feature region and the second feature region, if formed to be spaced apart, may prevent a template applied to the first feature region from being damaged when the second feature region is modified.

In addition, the second feature region may include a first feature line generated by connecting the first feature point and the second feature point. The second feature region may include a first point formed to be spaced apart from the first feature point by a first distance in the longitudinal direction of the first feature line, and a second point formed to be spaced apart from the second feature point by a second distance in the longitudinal direction of the first feature line. In addition, the second feature region may include a third point formed to be spaced apart from the first feature point by a third distance in a direction perpendicular to the longitudinal direction of the first feature line, a fourth point formed to be spaced apart from the first feature point by a fourth distance in a direction opposite to the direction in which the third point is formed, a fifth point formed to be spaced apart from the second feature point by a fifth distance in a direction perpendicular to the longitudinal direction of the first feature line, and a sixth point formed to be spaced apart from the second feature point by a sixth distance in a direction opposite to the direction in which the fifth point is formed. The first to sixth distances may have the same length.

The process in which the first to sixth points are formed from the first and second feature points and in which the second feature region is formed from the first to sixth points is the same as described above in connection with the image processing method according to the present disclosure.

The control unit 200 may further include a region modifying unit 240 configured to modify the second feature region. The region modifying unit 240 may apply at least one of a predetermined color or a predetermined pattern to the second feature region generated by the region generating unit 230. The predetermined color may be a single color, and may be an average of pixel values of some pixels constituting the second feature region. The average of pixel values may be allocated to a center pixel among the pixels, and a second feature region blurring process may thus be performed. Various filtering schemes described above may be used to perform the blurring process.

The control unit 200 may further include an image data extracting unit 260. The image data extracting unit 260 may extract image data to which the content of modification of the second feature region has been applied as anonymized image data. The extracted anonymized image data may be stored in the database unit 100. Through the anonymized image data, the user may discuss a corrective plan with another practitioner, and exposure of the patient's personal information may be minimized in this process. This is advantageous in that the anonymity of the patient is guaranteed.

Meanwhile, at least a part of the process in which the control unit 200 performs operations described above may be visually displayed through the display unit 300 such that the user and the patient may establish an optimal corrective plan related to the patient through the display unit 300. In addition, predetermined processing is performed such that the second feature region is modified, thereby minimizing exposure of the patient's face and guaranteeing anonymity.

Although the technical spirit of the present disclosure has been described by the examples, various modifications and changes can be made without departing from the scope of the present disclosure which can be understood by those skilled in the art to which the present disclosure pertains.

Therefore, embodiments disclosed in the present disclosure are not intended to limit but describe the technical concept of the present disclosure, and the scope of the technical concept of the present disclosure is not limited by the embodiments. The scope of protection of the present disclosure is to be interpreted by the appended claims, and all technical concepts falling within equivalent scope thereof are to be interpreted as falling within the claimed scope of the present disclosure.

INDUSTRIAL APPLICABILITY

The present disclosure provides an image processing method and an image processing device using the same, wherein a part of image data is modified by using feature points, thereby guaranteeing the patient's anonymity and providing a treatment plan.

What is claimed is:

1. A computer-implemented image processing method comprising:
   receiving at least one piece of image data as an input, the image data comprising face data in which an oral cavity is open to expose teeth;
   assigning a plurality of feature points to the image data, the plurality of feature points including a first feature point and a second feature point corresponding to lateral angles of respective eyes;
   fitting the image data to have a predetermined size based on a feature line generated by connecting the first feature point and the second feature point;
   generating a first feature region on the image data by connecting at least three of the plurality of feature points, the first feature region constituting lip insides of the face data;
   generating a second feature region on the image data based on the feature line, the second feature region spaced apart from the first feature region;
   designing a smile line by applying at least one template to the first feature region, wherein the at least one template comprises corrected tooth data; and
   anonymizing the face data by modifying the second feature region, wherein the modifying of the second feature region comprises applying at least one of a predetermined color or a predetermined pattern to the second feature region.

2. The computer-implemented image processing method of claim 1, wherein the second feature region comprises the first feature point and the second feature point which constitute eye contours of the face data.

3. The computer-implemented image processing method of claim 2, wherein the second feature region comprises a first feature line generated by connecting the first feature point and the second feature point, and
   wherein the second feature region comprises a first point spaced apart from the first feature point by a first distance in a longitudinal direction of the first feature line, and a second point spaced apart from the second feature point by a second distance in the longitudinal direction of the first feature line.

4. The computer-implemented image processing method of claim 3, wherein the second feature region comprises a third point spaced apart from the first feature point by a third distance in a direction perpendicular to the longitudinal direction of the first feature line, a fourth point spaced apart from the first feature point by a fourth distance in a direction opposite to a direction in which the third point is formed, a fifth point spaced apart from the second feature point by a fifth distance in a direction perpendicular to the longitudinal direction of the first feature line, and a sixth point spaced apart from the second feature point by a sixth distance in a direction opposite to a direction in which the fifth point is formed.

5. The computer-implemented image processing method of claim 4, wherein the first distance to the sixth distance are identical.

6. The computer-implemented image processing method of claim 1, wherein the predetermined color is an average of pixel values of pixels constituting the second feature region.

7. A computer-implemented image processing device comprising:

a database unit in which at least one piece of image data is stored;

a control unit; and a display unit configured to visually display a performing result of the control unit, wherein the control unit is configured to:

receive the image data from the database unit as an input and assign a plurality of feature points to the image data, wherein the image data comprises face data in which an oral cavity is open to expose teeth, and the plurality of feature points include a first feature point and a second feature point corresponding to lateral angles of respective eyes;

fit the image data to have a predetermined size based on a feature line generated by connecting the first feature point and the second feature point;

generate a first feature region on the image data by connecting at least three of the plurality of feature points, the first feature region constituting lip insides of the face data;

generate a second feature region on the image data based on the feature line, the second feature region spaced apart from the first feature region;

design a smile line by applying at least one template to the first feature region, wherein the at least one template comprises corrected tooth data; and anonymize the face data by modifying the second feature region, wherein the modifying of the second feature region comprises applying at least one of a predetermined color or a predetermined pattern to the second feature region.

8. The computer-implemented image processing device of claim 7, wherein the second feature region comprises the first feature point and the second feature point which constitute eye contours of the face data.

9. The computer-implemented image processing device of claim 8, wherein the second feature region comprises a first feature line generated by connecting the first feature point and the second feature point, and wherein the second feature region comprises a first point spaced apart from the first feature point by a first distance in a longitudinal direction of the first feature line, and a second point spaced apart from the second feature point by a second distance in the longitudinal direction of the first feature line.

10. The computer-implemented image processing device of claim 9, wherein the second feature region comprises a third point spaced apart from the first feature point by a third distance in a direction perpendicular to the longitudinal direction of the first feature line, a fourth point spaced apart from the first feature point by a fourth distance in a direction opposite to a direction in which the third point is formed, a fifth point spaced apart from the second feature point by a fifth distance in a direction perpendicular to the longitudinal direction of the first feature line, and a sixth point spaced apart from the second feature point by a sixth distance in a direction opposite to a direction in which the fifth point is formed.

11. The computer-implemented image processing device of claim 10, wherein the first distance to the sixth distance are identical.

12. The computer-implemented image processing device of claim 7, wherein the predetermined color is an average of pixel values of pixels constituting the second feature region.

* * * * *